United States Patent [19]
Olson

[11] Patent Number: 5,769,559
[45] Date of Patent: Jun. 23, 1998

[54] AUTOMATICALLY SETTING DRAW PIN ASSEMBLY

[76] Inventor: Brian R. Olson, 3018 Gordon Road, Regina, Saskatchewan, Canada, S4S 2T8

[21] Appl. No.: 490,232

[22] Filed: Jun. 14, 1995

[30] Foreign Application Priority Data

Jun. 23, 1994 [GB] United Kingdom .................... 9412631

[51] Int. Cl.⁶ ....................................................... B60D 1/02
[52] U.S. Cl. ............................ 403/322; 403/12; 403/319; 280/509; 280/515
[58] Field of Search .................................... 403/322, 321, 403/324, 326, 319, 315, 12, 316; 172/396, 677, 679; 280/508, 509, 515

[56] References Cited

U.S. PATENT DOCUMENTS

| | | | |
|---|---|---|---|
| 1,837,940 | 12/1931 | Ade ......................................... | 280/508 |
| 2,442,439 | 6/1948 | Schultz . | |
| 2,478,736 | 8/1949 | Balzer ................................. | 280/515 X |
| 2,556,748 | 6/1951 | Buckley .............................. | 280/515 X |
| 4,073,507 | 2/1978 | Dingess . | |
| 4,311,244 | 1/1982 | Hindin et al. ....................... | 280/515 X |
| 4,579,365 | 4/1986 | Breu .................................... | 280/515 X |

FOREIGN PATENT DOCUMENTS

| | | | |
|---|---|---|---|
| 1228381 | 10/1987 | Canada . | |
| 490019 | 6/1992 | European Pat. Off. ............... | 280/515 |
| 578073 | 1/1994 | European Pat. Off. ............... | 280/515 |
| 636427 | 9/1936 | Germany .............................. | 280/508 |
| 639396 | 11/1936 | Germany .............................. | 280/508 |
| 175469 | 5/1970 | Germany .............................. | 280/508 |
| 173359 | 12/1982 | Germany .............................. | 280/508 |

*Primary Examiner*—Harry C. Kim
*Attorney, Agent, or Firm*—Murray E. Thrift; Adrian D. Battison

[57] ABSTRACT

A draw pin assembly includes a hammer strap that mounts on the drawbar and a draw pin that extends through aligned draw pin holes in the hammer strap and drawbar. A latch mechanism supports the draw pin in a retracted position while a trigger in the hitch-receiving space of the assembly releases the latch when a towed implement hitch comes into the proper alignment with the draw pin. An automatic locking mechanism is used to lock the draw pin against inadvertent release. In one embodiment, the draw pin is fully recessed into the hammer strap when set and the latch and locking functions are provided by a loop type handle connected to the draw pin. This eliminates any elements projecting above the hammer strap to maximize the clearance for a tractor power takeoff.

12 Claims, 3 Drawing Sheets

AUTOMATICALLY SETTING DRAW PIN ASSEMBLY

FIELD OF THE INVENTION

The present invention relates to vehicle couplings, especially of the agricultural draw pin type.

BACKGROUND

Conventional practice in coupling an implement hitch to a draw bar using a draw pin has been to align the draw bar of the towing vehicle with the towed implement hitch and then to couple the two with the draw pin. While certain practical power-operated devices have been introduced recently, manual hook-up is still the norm.

The current trend in drawbar design is to use a hammer strap on the drawbar to provide a clevis type connection to the tongue of the towed implement. This raises the height of the drawbar assembly to the extent that when the draw pin is installed, there may be insufficient clearance for the tractor power take off (PTO). This effect is augmented with any draw pin setting mechanism that extends above the hammer strap.

SUMMARY

In its different aspects, the present invention relates to an arrangement for setting the draw pin automatically when the draw bar and the tongue are properly aligned, and to a pin assembly in which interference with the tractor PTO is minimized or eliminated.

According to one aspect of the present invention there is provided a draw pin assembly comprising:

a draw bar with a draw pin hole;

a hammer strap mounted on the draw bar with a hitch receiving space between the hammer strap and draw bar, the hammer strap having a draw pin hole aligned with the draw pin hole of the draw bar;

a draw pin adapted to extend through the aligned holes in the draw bar and the hammer strap;

latch means for latching the draw pin in a retracted position engaged in the draw pin hole in the hammer strap and clear of the hitch receiving space between the hammer strap and the draw bar; and trigger means projecting into the hitch receiving space between the hammer strap and the draw bar for engaging an implement hitch entering the space, the trigger means including means responsive to engagement of a hitch with the trigger means for releasing the latch means to allow the draw pin to fall into a set position in engagement with the hitch, the tongue and the hammer strap.

Preferably, the assembly includes a lock that is engaged automatically when the draw pin has set to prevent the inadvertent release of the draw pin.

According to another aspect of the present invention, there is provided a draw pin assembly including a hammer strap for mounting on a drawbar to provide a hitch-receiving space between the hammer strap and the drawbar, aligned draw pin holes in the hammer strap and the drawbar, and a draw pin to extend through the draw pin holes and a hitch in the hitch-receiving space, characterized in that:

the draw pin has a set position in which the draw pin in recessed fully into the hammer strap;

the assembly includes a loop handle pivotally mounted on the draw pin;

the hammer strap includes a recess for receiving portion of the handle adjacent the draw pin when the draw pin is in the set position; and the hammer strap has a lock seat with which the handle may be engaged to prevent the draw pin from being forced out of the set position.

Because that part of the handle adjacent the draw pin is received in a recess in the top of the hammer strap when the draw pin is set, no part of the assembly extends above the top of the hammer strap. This provides the maximum clearance for the tractor PTO.

In the preferred embodiment of the assembly, the loop handle has a latching position engaged with a cradle in the top of the hammer strap and supporting the draw pin in a retracted position.

BRIEF DESCRIPTION OF THE DRAWINGS

In the accompanying drawings, which illustrate exemplary embodiments of the invention.

DETAILED DESCRIPTION

Figure 1:
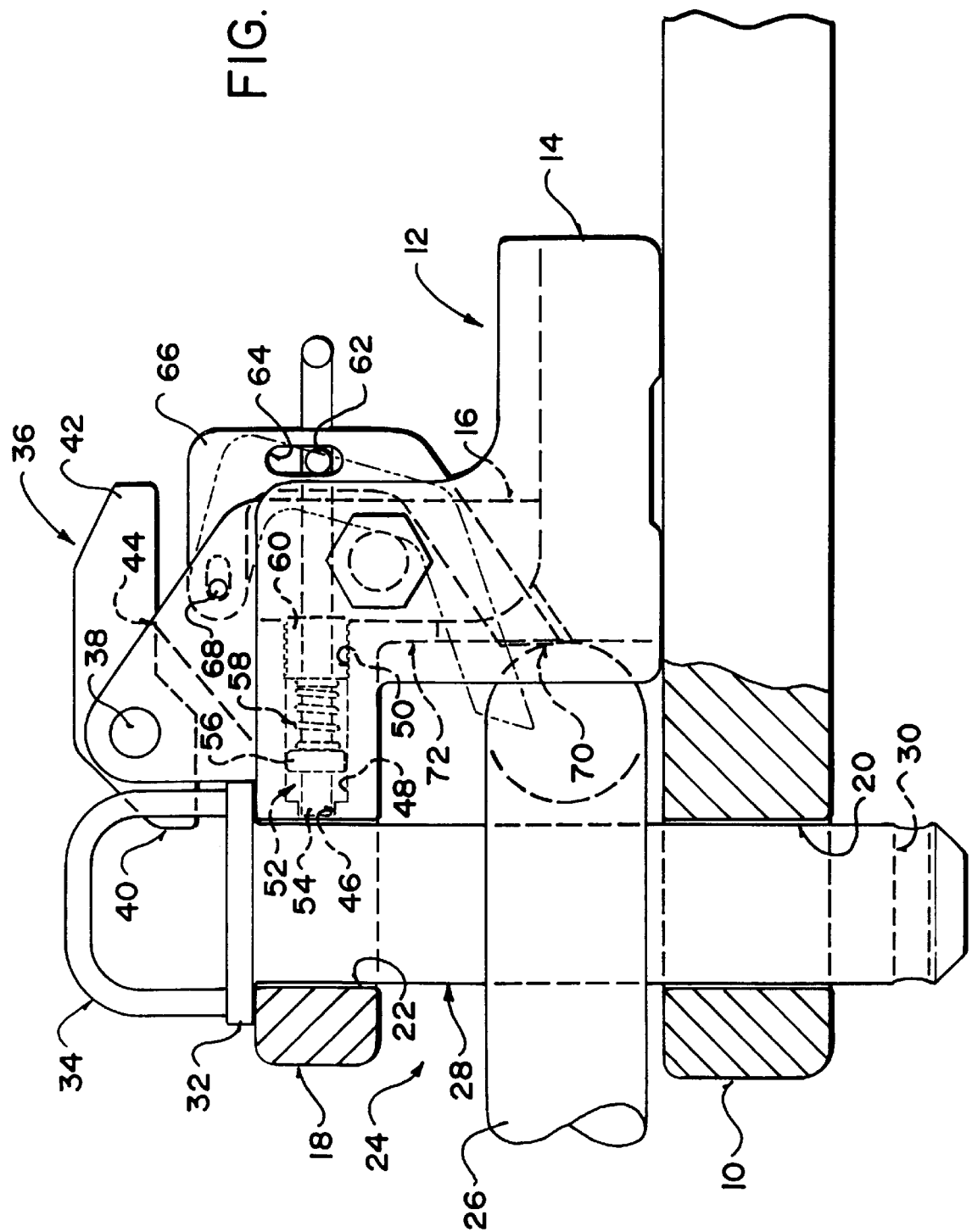
FIG. 1 is a side view of one embodiment of the present invention.

Referring to the accompanying drawings, there is illustrated in FIG. 1 a tractor draw bar 10 of a conventional type. Mounted on the draw bar is a hammer strap 12 with a base arm 14 bolted to the draw bar, an upright section 16 and an upper arm 18 extending over the outer end of the draw bar. The draw bar and the hammer strap have aligned openings 20 and 22 on opposite sides of a space 24 for accommodating an implement hitch 26. With an implement hitch in place as illustrated in the drawing, a draw pin 28 extends through the holes in the hammer strap and the draw bar and through the implement hitch to lock the hitch to the draw bar.

The draw pin has, near its bottom end, a diametrical hole 30. At its top end, it has a flange 32 and an inverted, U-shaped handle 34.

Mounted on the hammer strap adjacent the draw pin is a lock 36. This is a lever pivotally mounted by a pivot 38 to extend normally across the top of the draw pin flange to prevent it from being pulled from the engaged position. The lock lever has a short arm 40 that engages the flange and a longer arm 42 that is located on the opposite side of the pivot pin, to retain the lock in the locked position under gravity. In the locked position, the long arm 42 rests on an abutment 44. To release the lock, the long arm 42 is lifted to rotate the lock lever to a position where the flange 32 can be withdrawn upwardly past the lock.

Inside the hammer strap is a bore 46 opening into the hole 22 through the hammer strap. The bore 46 has a long counter-bore 48 at its outer end. The outermost portion 50 of the counter-bore 48 is threaded. Inside bore 46 and counter-bore 48 is a locking plunger 52 with a small diameter end 54 that slides in the small diameter bore 46 and a larger diameter section 56 that slides in counter-bore 48 and provides a seat for a coil spring 58 surrounding the plunger. The outer end of the bore 46 is closed by a screwed in bushing 60. The plunger extends through the bushing 60 and carries a cross pin 62 that engages in a slot 64 in a trigger lever 66. The trigger lever is pivotally mounted on the hammer strap by a pin 68 at its upper end. At its lower end 70 the trigger lever projects into the hitch receiving space between the draw bar and the hammer strap.

To release the draw pin, the draw pin lock arm 42 is raised and the draw pin handle 34 is pulled upwardly until the locking plunger 52 aligns with the bore 30 in the draw pin. At that time the spring 58 forces the plunger into the bore 30 in the draw pin, fixing the draw pin in the disengaged position.

To hook up, the tractor is backed up until the implement hitch aligns with the tractor hammer strap. This is facilitated by a cupped section 72 at the back end of the hammer strap which guides the implement hitch into proper alignment. The implement hitch will push back on the unlocking trigger 66, which withdraws the plunger 52 against the force of the spring 58, releasing the draw pin. The draw pin then drops into the space between the hammer strap and the draw bar. Depending on the size of the hole in the implement hitch, the draw pin will pass through the hitch and into the draw pin hole 20 in the draw bar, or it will remain partway set until the implement hitch is drawn slightly to the rear so that the implement hitch is fully aligned with the draw pin. When the draw pin sets fully, the draw pin lock is released by the draw pin 28 to assume the locked position, thus automatically locking the coupling.

Figure 2:
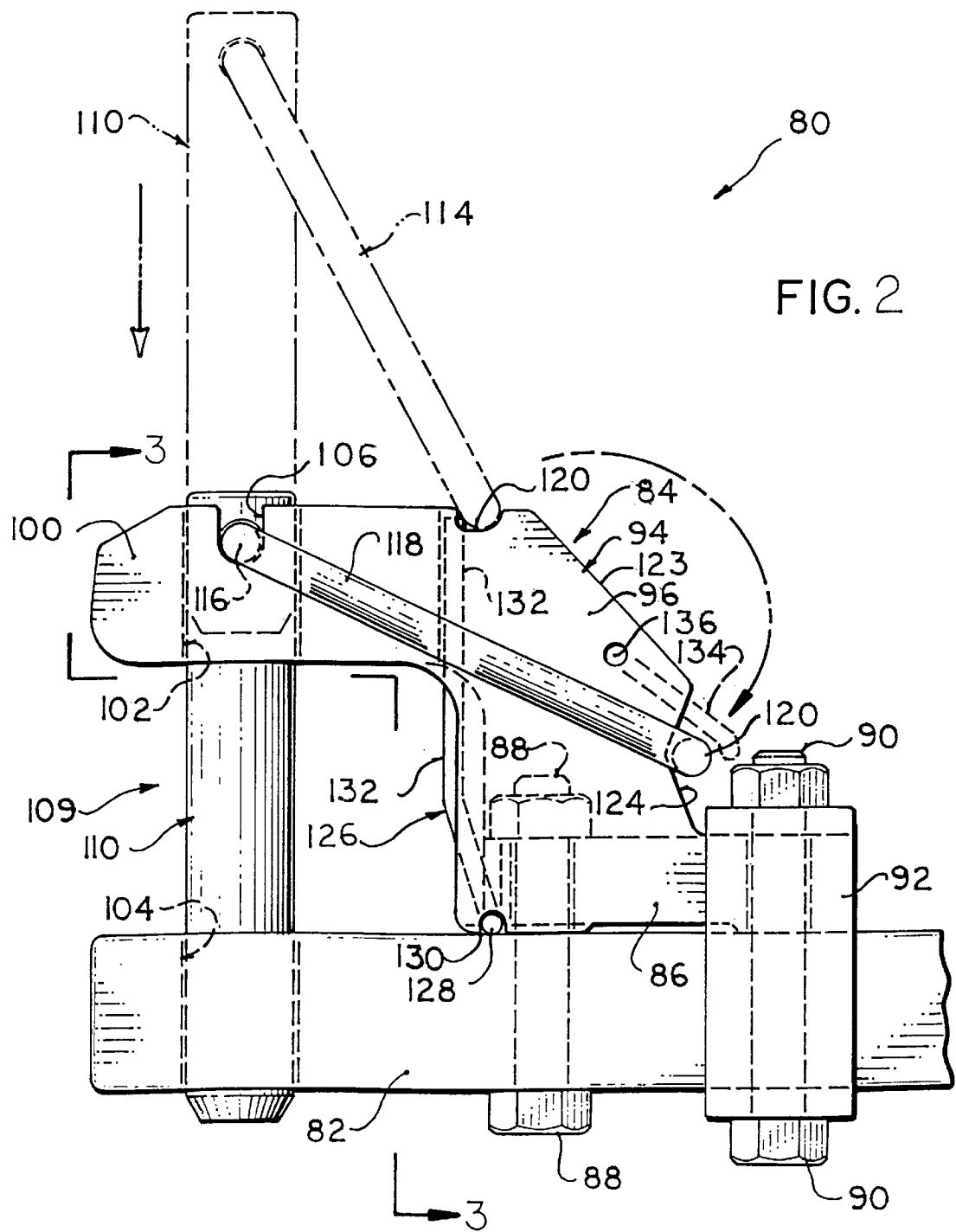
FIG. 2 is a side view of a second embodiment of the invention.
Figure 3:
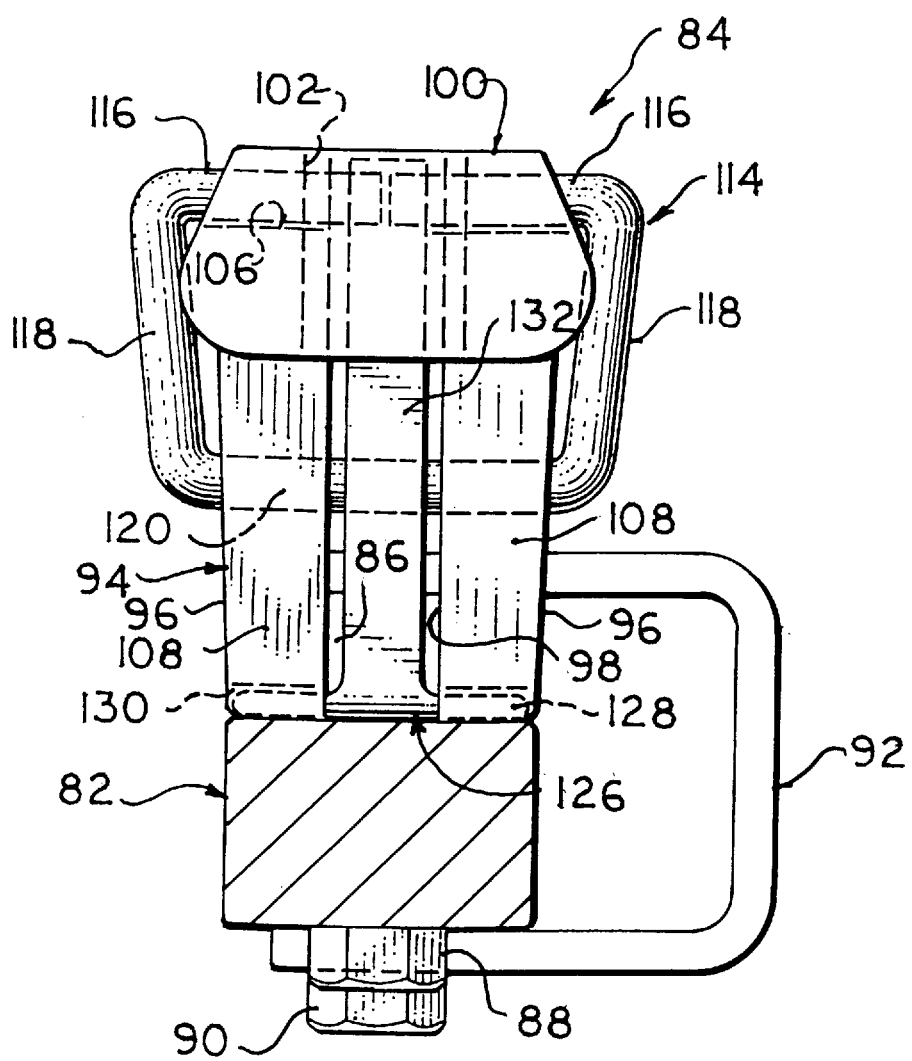
FIG. 3 is a view along line 3—3 of FIG. 2.

Another embodiment of the invention is illustrated in FIGS. 2 and 3. The draw pin assembly 80 includes a drawbar 82 of conventional form and a hammer strap 84 mounted on the drawbar. The hammer strap has a base section 86 that is fixed to the drawbar using two bolts 88 and 90. The bolt 90 is also used to fasten a C-shaped chain support 92 to the drawbar. An offset section 94 of the hammer strap projects upwardly from the base 86. It includes two side plates 96 separated by an open center zone 98. Extending from the offset section rearwardly over the drawbar is the arm 100 of the hammer strap that has a draw pin hole 102 aligned with the draw pin hole 104 of the drawbar. Across the top of the hammer strap, intersecting the draw pin hole 102 is a slot 106, the function of which will be described more fully in the following.

The front faces 108 of the side plates 96 converge towards the center to provide a "up" for centering an implement hitch (not shown) entering into the space 109 between the drawbar and the hammer strap.

A draw pin 110 fits into the two draw pin holes 102 and 104. In the set position illustrated in solid lines in FIG. 2, the draw pin is recessed fully into the hammer strap so that there is no projection above the top face of the hammer strap. The draw pin is equipped with a loop type handle 114 with lateral sections 116 projecting diametrically from the draw pin, near the top end. The lateral sections merge into two arms 118 which in turn merge into opposite ends of a cross arm 120. The handle pivots freely on the draw pin, about the axis of the two lateral sections 116.

A cradle 122 is formed in the top of the hammer strap, forwardly from the draw pin hole. In the retracted position of the draw pin, shown in ghost lines in FIG. 2, the cross arm 120 engages in the cradle 122 so that the handle 114 will act as a latch member supporting the draw pin in the retracted position. Immediately forwardly from the cradle 122, the side plates of the hammer strap have surfaces 123 that slope downwardly and to the front. Below the sloping face 123 and above the base 84, each side plate has a lateral stop notch 124.

When the draw pin is in the set position, as illustrated in solid lines in FIG. 2, the handle falls into the stop notch 124. The lateral sections 116 of the handle engage in the slot 106 and support the draw pin in the set position. Any force tending to urge the draw pin up will pull the handle into the stop notch 124, preventing movement of the draw pin. To release the draw pin, the handle 114 is simply pivoted upwardly out of the stop notch and used to raise the draw pin.

The assembly 80 is equipped with a trigger 126. This is an inverted, T-shaped component with two base pins 128 extending across the top of the drawbar and retained in place by two grooves 130 immediately in front of the hitch-receiving space 109. The upright arm 132 slopes upwardly and into the hitch-receiving space 109 and extends up to the top of the hammer strap where it is seated between the two side plates 96, against the front of the arm 100. The top end of the trigger arm 132 extends into the cradle 122. When an implement hitch engages the trigger 126, it is pivoted to the front, dislodging the handle 114 from the cradle 122, so that the handle no longer supports the draw pin. The draw pin will then drop into place and the handle will slide down the front of the hammer strap into the stop notch 124.

In some instances it may be desired to ensure against inadvertent release of the handle from the stop notch. In such a case, a retainer 134 (FIG. 2) may be mounted on the hammer strap using lateral bores 136 in the side plates 96. When desired, this may be positioned to retain the handle in the stop notch. The retainer can be used if it is desired to mount the hammer strap on the bottom side of the drawbar.

While certain embodiments of the invention have been described in the foregoing, it is to be understood that other embodiments are possible within the scope of the invention. The invention is to be construed as limited solely by the scope of the appended claims.

I claim:

1. A draw pin assembly comprising:
    a draw bar with a draw pin hole;
    a hammer strap mounted on a top side of the draw bar with a hitch receiving space between the hammer strap and the draw bar, the hammer strap having a draw pin hole aligned with the draw pin hole of the draw bar;
    a draw pin having a top end, the draw pin being movable between a retracted position engaged in the draw pin hole in the hammer strap and clear of the hitch receiving space between the hammer strap and the draw bar, and a set position with the top end of the draw pin recessed fully into the hammper strap and the draw pin extending through the aligned holes in the draw bar and the hammer strap;
    latch means having a supporting position for latching the draw pin in the retracted position and a released position releasing the draw pin to move into the set position, the latch means being below the top end of the draw pin when the draw pin is in the set position;
    trigger means projecting into the hitch receiving space between the hammer strap and the draw bar for engaging an implement hitch entering the space, the trigger means including means responsive to engagement of the hitch with the trigger means for releasing the latch means to allow the draw pin to fall into the set position in engagement with the hitch, the draw bar and the hammer strap.

2. An assembly according to claim 1 including lock means for locking the draw pin in the set position in response to movement of the draw pin to the set position.

3. An assembly according to claim 1 wherein the released portion of the latch means is a locking position retaining the draw pin in the set position.

4. An assembly according to claim 3 wherein the latch means comprises a latch member and the hammer strap includes a lock seat for engaging the latch member in the locking position of the latch means and preventing movement of the draw pin from the set position.

5. An assembly according to claim 1 wherein the latch means projects laterally from the draw pin and the hammer strap includes a recess for receiving the latch means in the set position of the draw pin.

6. An assembly according to claim 1 wherein the latch means comprises a latch member and the hammer strap includes a lock seat for engaging the latch member in the locking position of the latch means and preventing movement of the draw pin from the set position.

7. An assembly according to claim 6 including means mounting the latch member on the draw in for free pivotal movement with respect to the draw pin, and wherein the latch member is released from engagement with the lock seat by pivotal movement with respect to the draw pin.

8. A draw pin assembly comprising:

a draw bar with a draw pin hole;

a hammer strap mounted on a top side of the draw bar with a hitch receiving space between the hammer strap and the draw bar, the hammer strap having a draw pin hole aligned with the draw pin hole of the draw bar;

a draw pin having a top end, the draw pin being movable between a retracted position engaged in the draw pin hole in the hammer strap and clear of the hitch receiving space between the hammer strap and the draw bar, and a set position extending through the aligned holes in the draw bar and the hammer strap;

a latch member pivotally connected to the draw pin adjacent the top end thereof and having a supporting position for latching the draw pin in the retracted position and a released position releasing the draw pin to move into the set position, the latch member being below the top end of the draw pin when the draw pin is in the set position;

a cradle in the hammer strap for engaging the latch member in the supporting position of the latch member is support the draw pin in the retracted position; and trigger means projecting into the hitch receiving space between the hammer strap and the draw bar for engaging an implement hitch entering the space, the trigger means including means responsive to engagement of the hitch with the trigger means for releasing the latch member to allow the draw pin to fall into the set position in engagement with the hitch, the draw bar and the hammer strap.

9. An assembly according to claim 8 wherein the trigger means comprise means for displacing the latch member from engagement with the cradle.

10. A draw pin assembly including a hammer strap for mounting on top of a drawbar to provide a hitch-receiving space between the hammer strap and the drawbar, aligned draw pin holes in the hammer strap and the drawbar, and a draw pin to extend through the draw pin holes and a hitch in the hitch-receiving space, characterized in that:

the draw pin has a set position in which the draw pin is recessed fully into the hammer strap;

the assembly includes a handle pivotally mounted on the draw pin;

the hammer strap has a top side and includes a recess in the top side for receiving a portion of the handle adjacent the draw pin when the draw pin is in the set position;

the hammer strap has a lock seat below the top side of the hammer strap with which the handle may be engaged to prevent the draw pin from being forced out of the set position; and the handle is positioned below the top side of the hammer strap in the set portion of the draw pin.

11. An assembly according to claim 10 wherein the handle is freely pivotable on the draw pin.

12. An assembly according to claim 11 including a handle retainer for retaining the handle in engagement with the lock seat.

* * * * *